Jan. 1, 1924. 1,479,478
H. O. OLSON
SPRING SUPPORT FOR VEHICLES
Filed Feb. 26, 1921 2 Sheets-Sheet 1
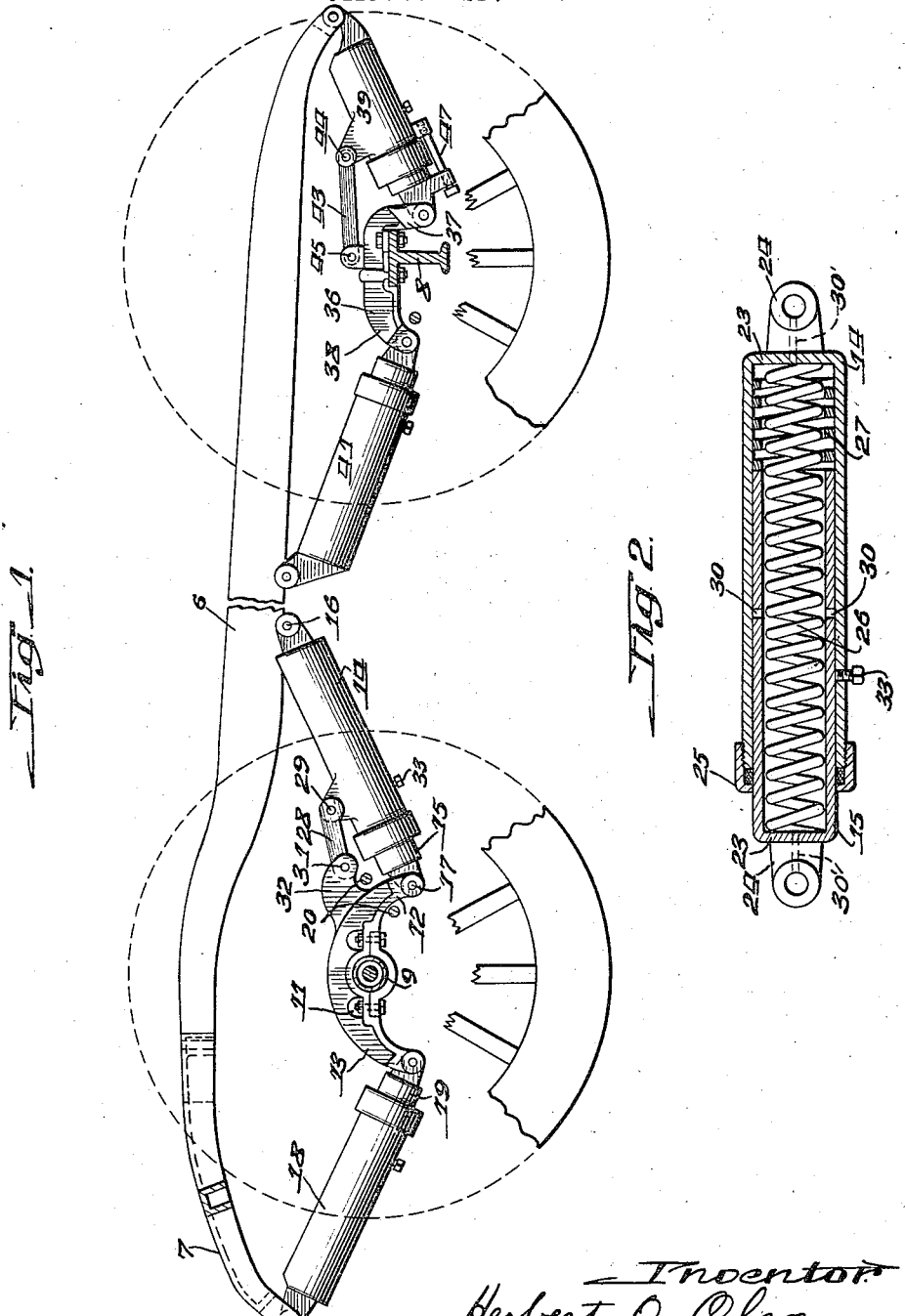
Inventor
Herbert O. Olson
By Ira J. Wilson
Atty.

Jan. 1, 1924. 1,479,478
H. O. OLSON
SPRING SUPPORT FOR VEHICLES
Filed Feb. 26, 1921 2 Sheets-Sheet 2
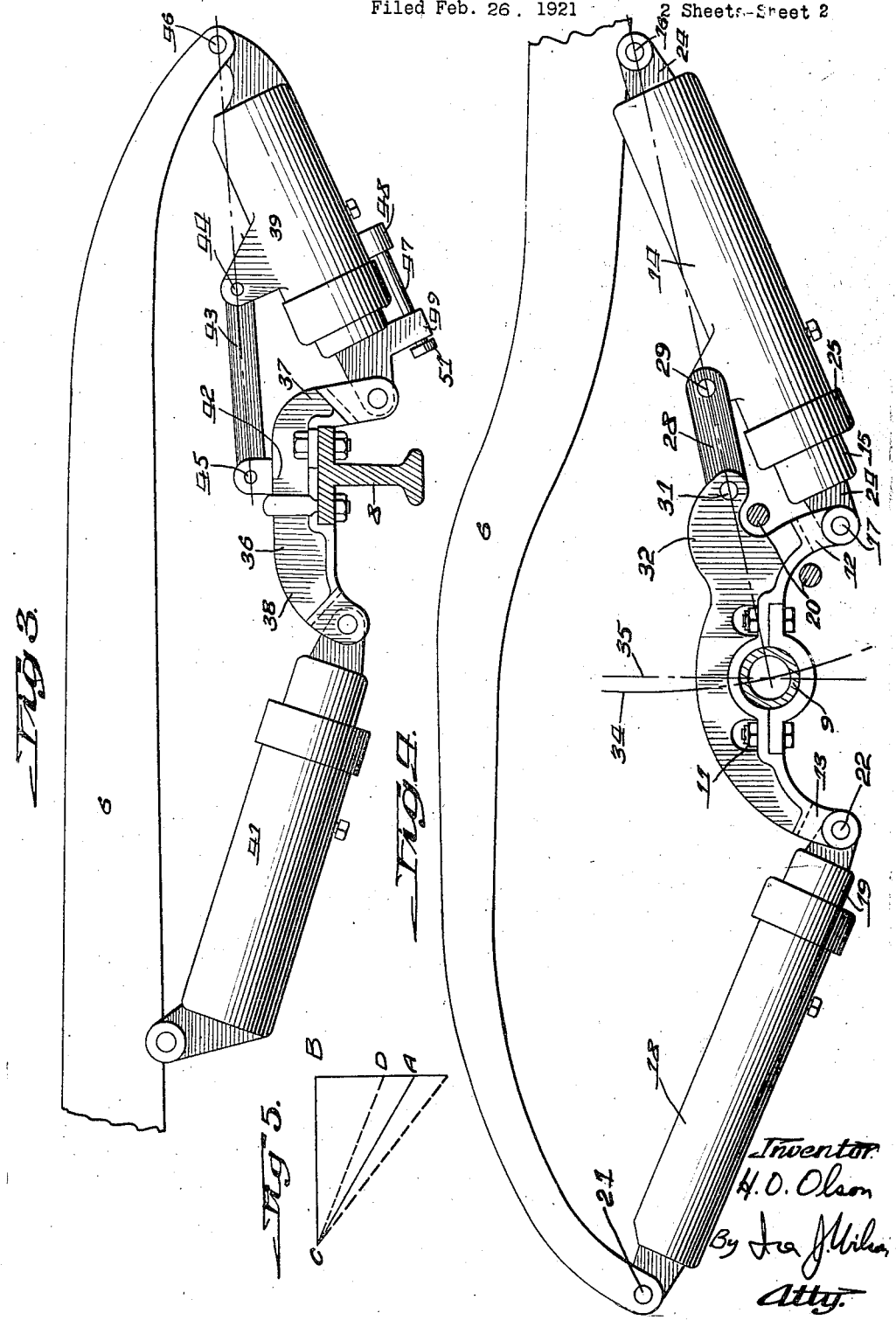

Patented Jan. 1, 1924.

1,479,478

UNITED STATES PATENT OFFICE.

HERBERT OLOF OLSON, OF ROCKFORD, ILLINOIS, ASSIGNOR TO THE BEDWELLS, A CO-PARTNERSHIP CONSISTING OF THOMAS A. BEDWELL AND CLARENCE A. BEDWELL, OF ROCKFORD, ILLINOIS.

SPRING SUPPORT FOR VEHICLES.

Application filed February 26, 1921. Serial No. 447,961.

*To all whom it may concern:*

Be it known that I, HERBERT O. OLSON, a citizen of the United States, residing at Rockford, in the county of Winnebago and State of Illinois, have invented certain new and useful Improvements in Spring Supports for Vehicles, of which the following is a specification.

This invention relates to spring devices for supporting the body of a vehicle upon its running gear, and has more particular reference to spring supports for automobiles, motor trucks and similar power driven vehicles, although adapted also for carriages, wagons and other vehicles.

The primary object of the present invention is to provide a novel and generally improved spring support which will effectually cushion and absorb the shocks, jolts and vibrations transmitted to the running gear by the more or less rough surface of the road, and especially by holes, ruts and obstacles of considerable size in or on the road surface.

Another important object is to provide a spring support of the character described constructed in such novel manner as to function efficiently, and so designed as to be capable of economical production.

I have also aimed to provide a toggle-like spring structure to be used in place of the conventional leaf springs now interposed between each end of the axles and the chassis, such structure comprising, generally stated, an axle saddle, and a front and a rear pair of telescoping tubes, housing coil compression springs and pivotally connected at their outer ends to the chassis and at their inner ends to the axle saddle. This construction permits a longer range of up and down movement of the axles relatively to the chassis than is possible with the usual leaf springs; and the several parts co-operate in such novel manner as to minimize the vibratory effects on the chassis due to traveling over uneven road surface.

My invention also contemplates other objects as follows: to provide an underslung connection between the front and rear telescoping tubes and the axle saddle, thereby promoting stability; to provide a tie rod between the axle saddle and the chassis for maintaining operative relation of these parts; to arrange said tie rod in a particularly advantageous manner as will be described hereinafter; to so construct the telescoping tubes that they may be produced economically and will possess ample strength under the most severe conditions of use; to provide coil compression springs of different degrees of pressure in the front and rear tubes to secure uniformity of vertical movement at the front and rear ends of the axle saddle; to provide a safety device for the front lever tubes, particularly in the application of the toggle lever structure to the front axle; to provide for self-lubrication of the working parts and pivot bolts; and to so generally improve the design and construction that it will be practical and serviceable commercially as a substitute for the ordinary leaf springs.

Other objects and attendant advantages will be appreciated by those skilled in this art as the invention becomes better understood by reference to the following description when considered in connection with the accompanying drawings, in which:

Figure 1 is a side elevation partly broken away of an automobile chassis and running gear embodying my invention;

Fig. 2, an enlarged sectional view through one of the telescoping toggle-arm units;

Figs. 3 and 4, enlarged side elevations of the front and rear spring assemblies showing in light and heavy dotted lines the upper and lower limits of movement; and Fig. 5, a diagrammatic view of the spring forces for the rear axle spring set.

In illustrating the principles of my invention, I have taken as an example, their application to a Dodge automobile. It should be borne in mind, however, that my invention is in no way limited to this, but is applicable, by whatever necessary modification, to any make of automobile and to any vehicle whether power driven or otherwise.

My invention provides a toggle-like spring structure to be used in place of the conventional semi-elliptic springs. Each toggle arm constitutes an endwise compressible and expansible unit in the form of telescoping tubes housing one or more coil compression springs. When these units are assembled in toggle arrangement, the weight of the vehicle and its load tends to compress the toggle lever through an endwise compressible action on the arms applied at the outer ends of the latter, and road obstructions tend to compress the toggle lever through a similar action on the arms applied at their lower or inner ends.

Referring now to the drawings, it will be observed that the chassis or body-supporting frame designated generally by reference character 6 is of conventional design, with the exception in the present instance that a supplemental end piece 7 is fixedly secured to the main chassis channel, providing the proper location for the rear toggle arm pivot. The toggle lever spring structures for the front and rear axles 8 and 9 respectively are in general principle alike; but inasmuch as there are conditions peculiar to each, they will be separately described.

The rear toggle structure best shown in Fig. 4, applied between each end of the rear axle and the chassis will be described first. It comprises a saddle bracket 11 of suitable construction mounted on the rear axle housing and shaped to provide depending front and rear arms 12 and 13, respectively, a front pair of telescoping tubes 14 and 15, the former of which is pivotally connected at 16 to the chassis 6, and the latter at 17 to the saddle arm 12, and a rear pair of rear telescoping tubes 18 and 19 pivotally connected respectively at 21 and 22, to the chassis 6 and saddle arm 13. In the present instance, the arm 12 is shaped to avoid interference with the brake rods 20. The outer end of each tube closed by an end wall 23 has formed integral therewith either a single or bifurcated lug 24 for the pivotal connection. The tubes 15 and 19 are finished outside to snugly fit the bored tubes 14 and 18, and a suitable packing nut 25 or the equivalent, and packing are provided for sealing the joint between each pair of tubes, making them oil-tight. Housed within each pair of front and rear tubes is a primary coil compression spring 26, the ends of which impose an outward thrust against the ends 23 of the tubes. A secondary coil compression spring 27 disposed in the space between the end wall of the outside tube and the shoulder provided by the inner end of the inside tube, is normally inactive and functions only under a given load, as will be explained hereinafter. A tie rod or link 28 is pivotally connected at its forward end 29 to a lug on the outer front tube 14 and at its rear end 31 to a lug integral with the saddle 11. A sufficient amount of lubricant of proper consistency is placed in each pair of tubes to thoroughly lubricate and envelop the compression springs. This lubricant forms a permanent film under all conditions between the telescoping tube surfaces; and the lubrication is facilitated by holes 30 through the walls of the inner tubes. The lubricant also works through the holes 30' by positive feed, capillary attraction and air compression action in the tubes, and lubricates the pivot bolts 16, 17, 21 and 22.

From the foregoing, it will be observed that the rear toggle lever set includes a front and a rear lever unit each in the form of a pair of telescoping tubes, housing one or more coil compression springs. Inasmuch as the springs carry the entire load, they are under considerable compression; and in order to facilitate assembly of the lever units in the toggle lever arrangement, each unit is put under normal compression substantially equal to the normal load and the tubes are locked in this position by a set screw 33 or the equivalent so that the unit may be easily handled and placed in position. It will now be observed that the toggle lever units have underhung connections with the axle and that the lines of force of the compression springs intersect substantially below the axle, consequently promoting stability of the axle saddle. This stability is further maintained and insured by the tie rod 28, the pivotal connections of which lie in a straight line intersecting the centers of the axle and front pivotal connections 16 when the parts are in normal position. The tie rod 28 maintains a permanent radius between the axle 9 and the pivotal connection 16. As a result of this co-ordination of parts, the axle 9 moves in the arc 34 under varying loads and impulses. When the springs are compressed under a load heavier than normal the axle recedes from the vertical plane 35 as indicated plainly in Fig. 4. It follows that there is materially less compression of the front spring than the rear spring; consequently less resiliency is required in the front spring than in the rear to maintain equal pressures at both sides of the axle which are necessary for uniform action of both elastically compressible toggle arms.

The forces involved in this spring support will be manifest from the following hypothetical case taken in consideration with Figs. 4 and 5. This example, for illustrative purposes only, is of a car of the Dodge type carrying a load equivalent to five passengers weighing 150 pounds each. Under these conditions in the normal position shown in full lines, each primary coil spring sustains a vertical load of approximately 406 pounds represented by the vertical line A—B. On the resultant line A—C the compression on the rear spring will be 1021 pounds. At a high position, that is, under an unusual load thrust, the primary spring will be compressed to such an extent as not to return to normal without some auxiliary influence. The secondary spring 27 is provided, therefore, to carry the balance of the load and cause the parts to be quickly returned to normal position. In this high position indicated by light dotted lines, a vertical load of 450 pounds is carried and the compression on the line D—C is 2285 pounds. The heavy dotted line position indicates substantially the lowest point to which the axle may drop suddenly under the thrust of the spring before it is followed by the load when the wheel encounters a deep hole or other depression in the roadway. Referring now to the front spring action of the rear set, it will be observed that due to the arc action of the wheel center, the compression of this front spring is materially less than the rear spring. At high position, through this lesser compression, the front spring must accumulate sufficient compressive strength to hold a vertical load equal to that of the rear spring; therefore, a heavier front spring is required. Thus through the uniform action of the front and rear springs and the use of a radius line 28, absolute stability of the axle and saddle is maintained. It follows that no unusual or detrimental strains are imposed on the appurtenant parts at any stage of the axle movement from its highest to lowest position. As regards the horizontal propelling force, it will be observed that this is translated through both the links 28 and the compression spring or springs in the front tubes, thus cushioning the thrust. It will be noted that the present construction affords a longer yielding movement between the axle and chassis resulting from encountering an obstacle or hole in the roadway, than is possible with the conventional spring constructions now in use. The result is that when traveling over an uneven roadway the lever arms are in constant action, as the load on the springs varies with each slight impulse, and by reason of the great compressibility and rapid expansibility of the springs and of the mechanical advantage afforded by the toggle arrangement, these impulses are so cushioned and absorbed as to have a minimum effect on the chassis and body and positively eliminate the rebound action so objectionable to the spring supports now in common use. Another factor in eliminating the rebound action is the influence of a partial vacuum created in the tubes by their expansion, it being noted that the tubes are practically air tight due to the oil seal and packings.

The description with reference to the rear spring set applies equally well to the front set, which comprises a saddle 36 fixed to each end of the axle 8, and a toggle lever unit between each forward and rear arm 37 and 38 respectively, and the chassis. The front and rear toggle lever or telescoping tube units 39 and 41 have primary and secondary coil compression springs, the front springs being heavier than the rear springs, as described above with reference to the rear set. The front wheel axis is substantially at the point 42 and the radius link 43 pivotally connected at 44 to the front outer tube and at 45 to the saddle 36 is arranged in a straight line connecting the pivot 45 and the front pivot 46 of the unit 39. Any tendency of the axle 8 to rock about the axis 42 is resisted by the link 43, thus insuring stability of the front axle, precluding any binding of the steering connections, and promoting uniformity of the front and rear spring action. A safety device between the outer and inner front tubes limits the downward projection of the inner tube and serves as an auxiliary means in resisting rotary action of the axle 8. This device comprises in the present instance, a bolt 47 fixed to the lug 48 on the front outer tube and slidable through a lug 49 on the inner tube, the head 51 constituting a stop which abuts against the lug 49 for limiting the movement of the inner tube. In view of the fact that the load on the front springs is more uniform than on the rear, the front springs are proportionally lightened, although the spring action is substantially the same.

The construction and operation of the spring suspension having been described in general as representative of the principles of my invention, attention is now directed to the function of such mechanism as a shock absorbing medium. It will be noted that the packing between each pair of telescoping sleeves effects not only a dust and dirt proof closure for the springs, but also constitutes an air check. The result is that a combined spring cushion and air-check action is obtained with a very simple and comparatively inexpensive construction. This action is especially effective in preventing rebound so noticeable in the ordinary automobile.

It is believed that the foregoing conveys a clear understanding of the principles and objects prefaced above, and while I have illustrated but a single working embodiment of my invention, it should be understood that the same is susceptible of considerable modification in its application to motor cars and vehicles of different design, without departing from the spirit and scope of the invention as expressed in the appended claims.

I claim:

1. A spring support for vehicles comprising in combination with a body-supporting member and an axle, of a spring toggle between said axle and said member supporting the latter on the former, said spring toggle comprising a front and a rear unit, each unit consisting of a pair of telescoping tubes and an interposed coil compression spring, the tubes of each unit being pivotally connected at its ends to said member and axle, and a tie-bar acting between said axle and member in a plane substantially coincident with the pivot axis of the front unit on said member.

2. In a spring support for vehicles, the combination with a body-supporting member and an axle, of a toggle support between said member and axle, one of the arms of said toggle support being elastically compressible and extensible, and both arms of the toggle support being pivotally connected at their outer ends to said member and at their inner ends to said axle at the front and rear of its axis for the purpose of increasing moment about the axis of the axle for stabilizing the latter, and a tie link between the axle and said member co-operating in stabilizing the axle.

3. In a spring support for vehicles, the combination with a body supporting member, and an axle, of a toggle lever support between said member and said axle comprising a front and a rear pair of telescoping tubes, the outermost tubes pivotally connected to the frame supporting member and the innermost tubes pivotally connected to the axle, a coil compression spring within each pair of tubes carrying the load, and a tie link between the axle and one of the outermost tubes.

4. A compressible and expansible unit operative between a body supporting member and an axle, said unit comprising telescoping tubes, a coil compression spring within the tubes, and means for locking the tubes together with the spring under compression and permitting release of the tubes after the unit has been assembled in a body supporting structure.

5. The combination of a body supporting member, an axle, a toggle lever support between said member and said axle comprising a pair of telescoping tube units, a coil compression spring within the telescoping tubes of each unit, the tubes of each unit constituting a lubricant retainer, pivot bolts connecting the units to the body supporting member and the axle, and a lubricant passage between each lubricant container and its pivot bolts.

6. In a spring support for vehicles, the combination with a body supporting member and an axle, of a toggle lever support between said member and said axle comprising a front and a rear pair of telescoping tubes pivotally connected at their outer ends to said member and at their inner ends to said axle, a coil compression spring within each pair of tubes for carrying the load, a tie link between the axle and one of the frame-connected tubes, and means operative between said frame-connected tube and its companion tube for limiting the movement of the latter tube under the influence of the compression spring.

7. In a spring support for vehicles, the combination with a body supporting member and an axle, of a toggle lever support between said member and said axle comprising a front and a rear pair of telescoping tubes pivotally connected at their outer ends to said member and at their inner ends to said axle, a coil compression spring within each pair of tubes for carrying the load, and a tie link between the axle and the front frame-connected tube maintaining a fixed radius between the axle and the pivot connection of the front tube.

8. A spring support for vehicles comprising a frame, an axle, a bracket on the axle, a front and a rear pair of telescoping tubes pivotally connected at their outer ends to the frame and at their inner ends to said bracket, a coil compression spring within each pair of tubes sustaining the load, and a tie link pivotally connected at its front end to the front frame-connected tube and at its rear end to the bracket.

9. A spring support for vehicles comprising a frame, an axle, a bracket on the axle, a front and a rear pair of telescoping tubes pivotally connected at their outer ends to the frame and at their inner ends to said bracket, a coil compression spring within each pair of tubes sustaining the load, and a tie link pivotally connected at its front end to the front frame-connected tube and at its rear end to the bracket, the axes of said link pivot connections lying in a plane substantially intersecting the axle and the pivotal connection of said front frame-connected tube.

10. A spring support for vehicles comprising a frame and an axle, a front and a rear pair of telescoping tubes pivotally connected at their outer ends to the frame and at their inner ends to the axle, means operative between the front frame-connected tube and said inner tube pivot connections for preventing oscillatory movement thereof about the axis of the axle as the latter moves vertically, and a coil compression spring within each pair of tubes sustaining the load, the spring in the rear tubes being of greater resiliency than that in the front tubes.

11. A spring support for vehicles comprising in combination with a body-supporting member and an axle, of a spring toggle between said axle and said member supporting the latter on the former, said spring toggle comprising a front and a rear unit, each unit consisting of a pair of telescoping tubes and an interposed coil compression spring, the tubes of each unit being pivotally connected at its ends to said member and axle, and a tie-bar acting between said axle and member in a plane substantially coincident with the pivot axis of the front unit on said member, the connection of said tie-bar with the axle being vertically spaced from the axis of the axle whereby to prevent oscillation of the latter.

12. A spring support for vehicles comprising a frame, an axle, a saddle bracket on the axle having a forward and a rear arm, a front and a rear pair of telescoping tubes pivotally connected at their outer ends to the frame and at their inner ends to said front and rear saddle arms respectively, a coil compression spring within each pair of tubes, and a tie link pivotally connected at its forward end to the front frame-connected tube and at its rear end to the saddle bracket.

13. A spring support for vehicles comprising in combination with a body-supporting member and an axle, of a spring toggle between said axle and said member supporting the latter on the former, said spring toggle comprising a front and a rear unit, each unit consisting of a pair of telescoping tubes and an interposed coil compression spring, the tubes of each unit being pivotally connected at its ends to said member and axle, and a tie-bar acting between said axle and member in a plane substantially coincident with the pivot axis of the front unit on said member, said tie-bar serving to prevent oscillation of the axle about its axis, to maintain substantially fixed distance between the axle and the pivot axis of the front unit on said member, and to allow dynamic compression of both units arising from irregularities of the road bed.

14. In a spring support for vehicles, the combination with a body-supporting member and an axle, of a spring toggle supporting said member on the axle comprising a front and a rear unit, the rear unit consisting of a pair of telescoping tubes and an interposed coil compression spring, said rear unit being pivotally connected at its opposite ends to said member and axle, and the front unit consisting of a connection between the axle and said member pivotally connected at its front end to said member and disposed in a plane substantially intersecting the pivot axis of said member for maintaining a constant radius between said pivot axis and axle during relative displacement of said member and axle.

HERBERT OLOF OLSON.